United States Patent [19]

Kerecz

[11] Patent Number: 5,525,242

[45] Date of Patent: Jun. 11, 1996

[54] APPARATUS AND PROCESS FOR THE AERATION OF WATER

[76] Inventor: Robert C. J. Kerecz, 2304 SW. 53rd St., Cape Coral, Fla. 33914

[21] Appl. No.: 325,062

[22] Filed: Oct. 19, 1994

[51] Int. Cl.[6] .................................. C02F 1/72; C02F 1/74
[52] U.S. Cl. .................. 210/758; 210/220; 261/DIG. 75; 261/76; 261/79.2; 48/189.5; 366/339
[58] Field of Search ................................. 261/DIG. 75, 76, 261/79.2; 366/339; 48/189.5; 210/749, 758, 220

[56] References Cited

U.S. PATENT DOCUMENTS

| | | | |
|---|---|---|---|
| 3,826,474 | 7/1974 | Pareja | 137/563 |
| 4,019,983 | 4/1977 | Mandt | 261/DIG. 75 |
| 4,210,534 | 7/1980 | Molvar | 261/DIG. 75 |
| 4,370,304 | 1/1983 | Hendriks et al. | 261/DIG. 75 |
| 5,169,293 | 12/1992 | Yamamoto | 261/DIG. 75 |

*Primary Examiner*—Neil McCarthy

[57] ABSTRACT

This invention relates to improved apparatus and to an improved process for the treatment of liquids, and particularly water for domestic consumption. The improved process for treating water to remove hydrogen sulfide and soluble mineral compounds while saturating the water with oxygen comprises feeding the liquid through a nozzle and contacting the liquid with an oxygen containing gas, e.g., air comprises utilizing a venturi nozzle having a nozzle extension that retains the water and air in the form of a confined stream as it is discharged therefrom. The nozzle extension preferably is equipped with restrictor means for directing water from the interior walls of the nozzle chamber toward the center and the nozzle extension directed so that the stream of water containing air is directly discharged from the nozzle extension into the water retained within the tank.

9 Claims, 1 Drawing Sheet

APPARATUS AND PROCESS FOR THE AERATION OF WATER

FIELD OF THE INVENTION

This invention relates to a process and an apparatus for the reduction and oxidation of dissolved gases and minerals in water.

BACKGROUND OF THE INVENTION

Certain areas of the United States have serious water problems due to the presence of dissolved gases and minerals. Hydrogen sulfide is one of the gases often contained in these waters and its presence renders domestic water unsuitable for consumption. Radon is another gas often trapped in water in some sections of the United States, and, if present in high concentrations, may be dangerous. Objectionable amounts of soluble iron compounds and soluble compounds of other metals such as manganese and strontium may also be present in these waters. These dissolved gases and minerals should be removed and/or oxidized in order to provide water of domestic quality.

Small levels of organic components, e.g., hydrocarbons, organic chlorides, etc., may also be present in domestic water. These organic components must be removed, not only for consumption purposes, but also in instances where environmental contamination must be alleviated.

A variety of liquid treatment processes have been developed involving the aeration of such liquids by contact with an oxygen containing gas to remove the objectionable gases from the liquid as well as oxidize any mineral salts to a relatively innocuous and unobjectionable forms or convert such salts to precipitates which may be filtered prior to use. Radon also has been effectively removed from aqueous streams by aeration. Organic components have been oxidized or stripped from the aqueous medium via aeration. Representative prior art processes disclosing the treatment of water via aeration for the purpose of providing domestic water free of objectionable gases, mineral salts, radon and organic contaminants are as follows:

U.S. Pat. No. 2,872,415 discloses a domestic water treatment process for removing hydrogen sulfide and water soluble mineral salts such as iron, manganese and strontium by contacting the water with air. In principle, the water is first atomized at atmospheric pressure via a spinning disk atomizer wherein it is violently mixed with a controlled stream of air. This mixture then is impinged against a barrier to enhance atomization and substantial oxidation of the water as it passes through the unit. Complete gas elimination is effected. The oxygen-saturated water is delivered to a detention tank which is exposed to the atmosphere and held for a short period of time, e.g., 20 to 60 minutes. Prior to use, the water is filtered for delivery to the household.

U.S. Pat. No. 2,591,134 discloses an apparatus for the aeration of liquids, and particularly water, suitable for the removal of undesirable gaseous components such as hydrogen sulfide. The apparatus consists of a shell having a water inlet and outlet and means for controlling the level of water in the shell. Aeration is effected by passing the water through a spray nozzle in communication with an upwardly opening venturi tube for producing a cone shaped spray of water. The spray is directed against a horizontally disposed baffle plate having a depending edge flange formed into a cone-shaped central part. Aeration of the water stream is effected by introducing air from the outside via a duct to the venturi tube. Violent mixing of the cone shaped spray of water and air is effected by the impingement of the spray against the horizontally disposed baffle plate. The resultant water mist then falls downwardly and collects in the bottom of the shell therein for subsequent use.

U.S. Pat. No. 2,495,937 discloses a water treatment process and apparatus for the stabilization and sterilization of water. The patent suggests that it has long been known to use softeners and filters, as well as aeration, to remove gases which are in solution in underground water, such gases including carbon dioxide, hydrogen sulfide, methane, etc. The patent also disclosing a process for the stabilization of treated water via chlorination, chlorination being effected subsequent to aeration in order to minimize chlorine losses to the atmosphere. The process involves withdrawing water from a bottom portion of a large pool of water in an elevated position, dividing the water stream into major and minor streams and forcing both major and minor streams toward an upper portion of the pool. Aeration is effected on the major stream and chemical treatment is effected on the minor stream.

U.S. Pat. No. 2,590,431 discloses a water aerator and filter system suited for removing objectionable gases such as carbon dioxide and hydrogen sulfide therefrom. The aeration device consists of a tank having agitation means therein, the agitation means having apertures to enhance aeration of the water. Water level within the tank is controlled by a flow control switch. Noxious vapors are vented to the atmosphere.

U.S. Pat. No. 3,151,064 discloses a water conditioning method for removing unpleasant odors and improving the taste via aeration. Aeration is effected by means of horizontally disposed nozzles having a plurality of small outlet passages oriented relative to each other so that water and gases discharged therefrom impinge against each other causing atomization of the water. The intercepting water streams break up into individual water droplets and assist the gas stream in dispersing the spray by creating a high degree of turbulence. The water droplets fall into the tank and are held for subsequent delivery to the user.

U.S. Pat. No. 4,869,832 discloses a radon removal system incorporating a packed mass transfer aeration column sized to fit a single story residential building. Air is blown upwardly through the column and comes in contact with radon-laden water. On contact the air forces the radon out of the water. The radon-laden air is removed from the top of the column and vented to the atmosphere. The treated water then is transferred to a storage tank for subsequent use.

U.S. Pat. No. 2,088,691 discloses a gas liquid contacting apparatus of a type similar to that previously described in U.S. Pat. No. 2,591,134. In operation, liquid is forced through a liquid jet at high velocity through a chamber having a double cone or venturi-like throat wherein it is caused to impinge against a deflector having a cone shaped protrusion. The periphery of the deflector has coaxially disposed serrated rings or skirts. Aeration is effected by introducing air into the venturi-like chamber via air inlets disposed below the liquid jet. The serrated rings are suited for the purpose of further breaking up the liquid stream.

SUMMARY OF THE INVENTION

This invention relates to an improved apparatus and to an improved process for the treatment of liquids, and particularly water rendering it suitable for domestic consumption.

Conventional aeration apparatus typically comprises a holding tank or vessel for the treated water coupled with actuating means for introducing water to the tank and effecting treatment thereof. These tanks are equipped with level control means such that when treated water is removed, additional water is introduced and treated thus bringing the level of water back to its original level. The water is contacted with air under conditions for removing dissolved gases and oxidizing minerals. A venturi nozzle connected to an air supply is often used to effect aeration of the water. A basic process for treating liquid, and particularly, water to remove hydrogen sulfide, methane, carbon dioxide, soluble mineral compounds and/or small levels of organic contaminants, by saturating the water with oxygen comprises feeding the water through a nozzle and contacting the water with an oxygen containing gas, e.g., air.

The improvement in the apparatus and process comprises resides primarily in a venturi nozzle having a chamber in which water and air are contacted and a nozzle extension that retains the water and air in the form of a confined stream as it is discharged therefrom. The nozzle extension preferably is equipped with restrictor means for directing water from the interior walls of the nozzle chamber toward the center and the nozzle extension directed so that the stream of water containing air is directly discharged from the nozzle extension into the water retained within the tank.

DRAWINGS

DETAILED DESCRIPTION OF THE INVENTION

Figure 1:
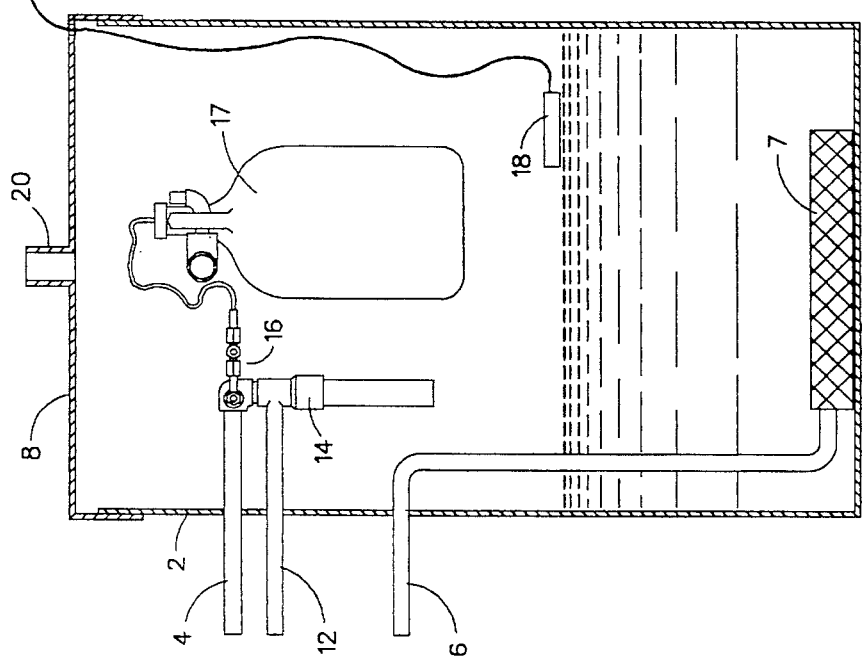
FIG. 1 is a vertical section in elevation taken through the water aeration apparatus.

Reference is made to the drawings to facilitate an understanding of the invention. The invention comprising the apparatus and process suited for use in effecting aeration of liquids thereby reducing the level of dissolved gases therein and oxidizing soluble salts and for producing water of high quality for household use is described in further detail. Referring to FIG. 1, the apparatus comprises a tank 2 which is vertically arranged for treatment of water. These tanks for residential and small apartment usage range in size from about 50 to 250 gallons with a fill time of 3 to 10 minutes although the tanks can be larger and flow rates adjusted depending on the domestic requirements. The lower portion of tank 2 generally is adapted for holding the treated water while the upper portion of tank 2 generally is adapted for aeration of the contaminated water and removal of dissolved gas. Tank 2 is equipped with an inlet 4 for introduction of contaminated water and an outlet 6 for removal of treated water. A filter 7 may be introduced into outlet 6 for purposes of removing particulate matter and precipitated salts formed by the oxidation of minerals prior to delivery to the end use application. The filter often is equipped with a bypass of to permit sufficient flow to prevent damage to the delivery pump should the filter become plugged. Optionally, outlet 6 may be used to drain tank 2 or tank 2 may be provided with a separate drain. Tank 2 is closed to the elements by means of lid 8. Lid 8 carries a vent 10 which is capable of permitting waste gases to escape to the atmosphere. Typically, the vent is designed to permit ingress and egress of air to the atmosphere but prevent debris and insects from entering. Tank 2 also is equipped with an air inlet 12 for supply of oxygen containing gas, e.g., air to a venturi aeration system 14.

The key to aeration of the contaminated water is in venturi aeration system 14. As is shown in FIG. 1, venturi aeration system 14 is supported in an upper section of tank 2, generally along the side. It is supported in a generally vertical position with the discharge from the venturi being directed toward the lower portion of tank 2. Preferably the venturi aeration system is mounted above the water level so that the discharge therefrom is into the treated water. It can be directed so the discharge is upward or horizontal, but preferred results are obtained when the discharge is directed generally in a downward direction. Alternatively, the venturi may be submerged with the discharge directed substantially downward or horizontally, preferably downwardly. Optionally, a separate venturi halogenating system 16 is provided within tank 2. It, too, is held in a generally vertical position with the discharge thereof preferably directed downwardly toward the lower portion of tank 2 and into the treated water.

Figure 2:
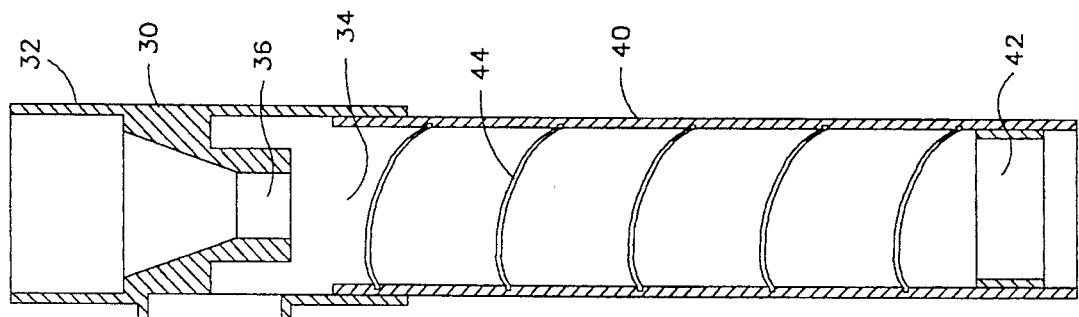
FIG. 2 is a sectional view in of the venturi aeration nozzle and nozzle extension.

As more clearly shown in FIG. 2, which is a view in cross section of the venturi nozzle and nozzle extension, the venturi aeration system 14 consists of a tee 30 having a venturi water inlet 32 at an end of the tee which is adapted for communication with water inlet 4 in tank 2 and a nozzle chamber 34. Tee 30 is tubular and typically cylindrical in shape. Venturi water inlet 32 is disposed within nozzle chamber 34 and narrows down to cone shaped nozzle 36. Cone shaped nozzle 36 has reduced cross sectional area vis-a-vis the venturi water inlet 32. By virtue of the reduced cross sectional area or the nozzle, the velocity of the water as it is passes through the nozzle and thus through the venturi aeration system is caused to increase creating a venturi like effect. Unlike cone shaped nozzles used heretofore for effecting aeration of the water passing through, the stream discharged therefrom is focused and confined rather than fan shaped, fan shaped resulting in atomization of the stream. Air or other oxygen containing gas is introduced through venturi air inlet 38 which is positioned at an angle, generally positioned at a 90° right angle, to venturi water inlet 32 and is adapted for communication with air inlet 12 in tank 2. Air from outside tank 2 is pulled into nozzle chamber 34 by the venturi effect created by the passing of high velocity water from cone shaped nozzle 36 into nozzle chamber 34. Air is caused to pass from the discharge of venturi air inlet 38 across the discharge end of cone shaped nozzle 36 and into nozzle chamber 34. Venturi inlet chamber 38 is sized to inlet chamber 32 such that the volume ratio of air vis-a-vis water passing through venturi aeration section 14 is at least 1:1 and preferably at least 5:1. For residential usage the diameter of the venturi water inlet preferably will range from about ¾ to 1½ inches narrowing down to a cone shaped nozzle diameter at the tip of about 3/16 to ½ inches. This ratio provides sufficient water velocity and capacity so that a substantial volume of air will come into contact with the water. For effective oxidation and/or stripping of dissolved gases or organic components, a high air to water volume ratio is required.

Figure 4:
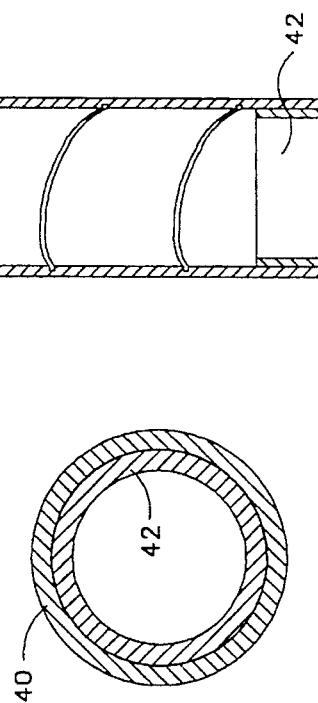
FIG. 4 is a view in cross section of the nozzle chamber and restrictor.

A nozzle extension 40 is disposed at the end of tee 30 which is in axial alignment with venturi water inlet 32. Nozzle extension 40, as shown, is of smaller diameter than that of the nozzle chamber 34. Although, nozzle extension 40 may be slightly narrower in diameter and embrace the interior surface of tee 30. Nozzle extension 40, as shown, generally extends from about 5 to 15 inches below the discharge end of cone shaped nozzle 36. It has a length such a portion of the water prior to discharge from cone shaped nozzle 36 contacts the interior walls of the nozzle extension. Cone shaped nozzle 34 may be modified to enhance such side wall or interior wall contact by directing the water discharged therefrom while maintaining a generally focused stream as is passes through the nozzle extension. At a point generally near the discharge end of nozzle extension 40, typically ½ to 1½ inches from the discharge end there is positioned a restrictor 42 which serves to force the water as it passes through the nozzle extension 40 from the interior walls or sides toward the center of the nozzle extension. The restrictor 42 is located proximate a discharge end of the nozzle extension 40. The restrictor 42 comprises an annular element of constant innner diameter that is smaller than a constant inner diameter of the nozzle extension 40 upstream from the restrictor 42. The nozzle extension 40 resumes downstream from the restrictor 42 at the same constant inner diameter of said nozzle extension 40 upstream from the restrictor 42. A view in cross section of the nozzle extension and restrictor is shown in FIG. 4. In effect, restrictor 42 causes the water flowing down the walls to hold up in the nozzle. The high velocity, focused water stream exiting cone shaped nozzle 42, coupled with incoming air, impacts the water held within nozzle extension 40 and causes substantial mixing and substantial aeration thereof. Restrictor 42 is sized to reduce the cross sectional area of nozzle extension 40 by about 10 to 30 percent. Optionally, nozzle extension 40 carries a spiral groove 44 on its interior surface. Spiral groove 44 tends to cause the water as it is discharged from cone shaped nozzle 36 to spiral much like rifling in the barrel of a rifle. The spiral effect is believed to add to the turbulence in nozzle extension 40, particularly when the water is forced from the interior walls to the center by restrictor 42 and in contact with the high velocity stream from cone shaped nozzle 34. If nozzle restrictor 40 is not present, and a small portion of water forced from the walls and possibly held up within nozzle extension 40, air from the tank which is contaminated with dissolved gases may contact the water. But, more importantly, the volume of air pulled in via air inlet 38 by the venturi effect in venturi aeration system 14 is substantially less. As a result there may be less oxidation of the minerals and less removal of dissolved gases.

As is known the key to removing dissolved gases such as carbon dioxide, methane, radon and hydrogen sulfide from contaminated water lies in effecting substantial aeration of the water. The venturi aeration system is extremely effective in achieving this result. One feature is that the meeting of air with high velocity water from cone shaped nozzle 36 causes substantial turbulence within nozzle chamber 34. This turbulence causes enhanced mixing of the air with the water. Nozzle extension 40 retains the mixture of water and air under pressure for a slight period of time. Obviously, that time is dependent upon the length of the nozzle. But, nonetheless, that time serves to incorporate the air into the water. In addition, if restrictor 42 is used in addition to the extension provided by extended nozzle 40, further pressure and higher velocity are imparted thereby creating turbulence and mixing of air with the water in the confined space of the nozzle. Then, on discharge, there is a release of pressure causing dissolved gas to be flashed therefrom. Additionally, the rotation of the water as it is discharged from extended nozzle 40 tends to focus the stream into a narrow path causing it to strike the treated water with more force causing greater turbulence and air retention in the treated water retained in the lower portion of tank 2. By causing the water-air mixture to be discharged into the treated water under high velocity, the treated water is contacted with additional oxygen containing gas which can bubble through the treated water and remove any residuum of undesirable gases. That feature is essentially lost if the discharge is directed away from the water retained in the lower portion of tank 2.

Figure 3:
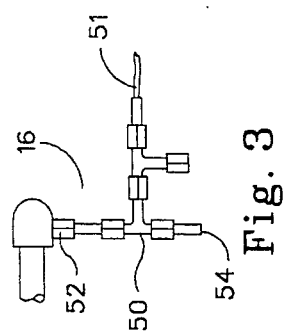
FIG. 3 is a view in elevation of the venturi halogenation system.

Residual treatment of the aerated water to remove bacteria and organic components is accomplished via treatment with a halogen, e.g., chlorine or bromine. Preferably, chlorine is used as the agent for treatment. Referring primarily to FIG. 3, halogenation is accomplished by means of a venturi halogenation system 16. It consists of a tee chamber 50 having two ends in axial alignment and a leg in perpendicular alignment with the other legs. A conduit 52 which comprises a narrow tube 51 communicates with a halogen source 17. One of the axially aligned legs 52 is in communication with venturi water inlet chamber 32 whereby a small portion of water introduced via water inlet 4 is diverted through the axially aligned leg of tee chamber 50. Water as it passes through the venturi halogenation system 16 pulls a small amount of the halogen treating agent through the perpendicularly aligned leg into tee chamber 50 wherein it is then discharged from the other axially aligned leg 54 to the treated water retained in the lower portion of tank 2. The turbulence created in the treated water by venturi aeration system 14 is sufficient to effect thorough mixing of the halogen treating agent with the treated water. The venturi halogenation system 16 is sized such that a small preselected amount of halogen is introduced to the treated water in conventional amounts.

The water treatment system may be made from conventional materials of construction. Often tank 2 is made from reinforced polyester, polypropylene, or high density polyethylene while the venturi aeration system and venturi halogenation system are made from nylon or other polymeric components. As with conventional treatment systems, electrical control means 18 can be provided to maintain a desired liquid level in the tank coupled with a moderate residence time to permit escape of dissolved gases.

In contrast to many of the aeration systems developed heretofore, the water as it is discharged from the venturi nozzle extension is maintained within a narrow high velocity stream. Many or the earlier venturi systems focused on atomizing the water as it was discharged from the venturi nozzle.

What is claimed is:

1. In a process for the aeration of domestic water contaminated with trace levels of dissolved gas and/or an oxidizable mineral salt wherein said contaminated water is passed through a venturi nozzle retained within a vessel, contacted with an oxygen containing gas under conditions for oxidizing and/or removing said gas and/or oxidizing said mineral salt, discharged from the venturi nozzle and then the resultant aerated water collected within the vessel, the improvement for improving the taste and removing objectionable odor from the water which comprises:

utilizing a venturi nozzle having a nozzle chamber in which water and oxygen containing gas are contacted, the contaminated water passing through the venturi nozzle and discharging into the nozzle chamber, said venturi nozzle having a nozzle extension in communication with the nozzle chamber and venturi nozzle which retains the water mixed with oxygen containing gas in the form of a confined steam, discharging the confined stream therefrom and venting gases from the vessel, said nozzle extension having a restrictor therein, said restrictor located within said nozzle extension, said restrictor comprising an annular element of constant inner diameter that is smaller than a constant inner diameter of the nozzle extension upstream from said restrictor, and wherein said nozzle extension resumes downstream from said restrictor at the same constant inner diameter of said nozzle extension upstream from said restrictor.

2. The process of claim 1 wherein the venturi nozzle comprises a tee having a water inlet that discharges into a nozzle chamber and an inlet for oxidizing gas which discharges into said nozzle chamber at an angle to said water inlet.

3. The process of claim 1 wherein the confined stream discharged from the nozzle extension is directed toward the water retained in the lower part of the vessel.

4. The process of claim 3 wherein the restrictor reduces the cross sectional area of the nozzle extension by about 10 to 30% and said restrictor is located proximate a discharge end of the nozzle extension.

5. The process of claim 4 wherein the tee is substantially cylindrical with nozzle extension having a spiral groove extending along its length.

6. The process of claim 4 wherein the venturi nozzle has a tip diameter of from about 3/16 to 1/2 inch.

7. The process of claim 6 wherein the diameter of said inlet for oxidizing gas is from about 3/4 to 1 1/2 inches and the diameter of the nozzle extension is from about 3/4 to 1 1/2 inches.

8. The process of claim 7 wherein the inlet for oxidizing gas is an air inlet and is approximately 90° to said water inlet.

9. The process of claim 8 wherein a halogen source is added to said aerated water.

* * * * *